(12) United States Patent
Takahashi et al.

(10) Patent No.: US 7,289,884 B1
(45) Date of Patent: Oct. 30, 2007

(54) HAND CONTROL SYSTEM, METHOD, PROGRAM, HAND, AND ROBOT

(75) Inventors: Kazuyuki Takahashi, Wako (JP); Tadaaki Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/676,361

(22) Filed: Feb. 19, 2007

(30) Foreign Application Priority Data

Mar. 2, 2006 (JP) ............................. 2006-056951

(51) Int. Cl.
*G06F 19/00* (2006.01)

(52) U.S. Cl. ................. 700/245; 700/247; 700/248; 700/251; 700/257; 700/258; 700/259; 700/260; 700/261; 700/262; 700/264; 318/568.12; 318/568.13; 318/568.16; 318/568.21; 318/568.25; 901/1; 901/2

(58) Field of Classification Search ................ 700/245, 700/247, 248, 251, 257, 258, 259, 260, 261, 700/262, 264; 318/568.11, 568.12, 568.13, 318/568.16, 568.21, 568.25; 600/117, 118, 600/407, 426, 429, 587, 595; 606/1, 102, 606/130, 139; 901/1, 2, 27
See application file for complete search history.

(56) References Cited

U.S. PATENT DOCUMENTS 6,463,356 B1 * 10/2002 Hattori et al. ............... 700/245
6,832,131 B2 * 12/2004 Hattori et al. ............... 700/245
6,917,175 B2 * 7/2005 Hattori et al. ............... 318/567
7,013,201 B2 * 3/2006 Hattori et al. ............... 700/245
2006/0247799 A1 * 11/2006 Takenaka et al. ............. 700/54

FOREIGN PATENT DOCUMENTS

| JP | 2001-347482 | 12/2001 |
| JP | 2003-181787 | 7/2003 |
| JP | 2005-007486 | 1/2005 |
| JP | 2005-125462 | 5/2005 |

\* cited by examiner

*Primary Examiner*—Thomas Black
*Assistant Examiner*—McDieunel Marc
(74) *Attorney, Agent, or Firm*—Rankin, Hill, Porter & Clark LLP

(57) ABSTRACT

According to the hand control system (2), the position and posture of a palm (10) are controlled such that the object reference point ($P_w$) and the hand reference point ($P_h$) come close to each other and such that the i-th object reference vector ($\alpha_{wi}$) and the i-th hand reference vector ($\alpha_{hi}$) come close to each other. During the controlling process of the position and posture of the palm, the operation of a specified finger mechanism is controlled such that the bending posture of the specified finger mechanism gradually changes (for example, such that the degree of bending gradually increases). This ensures accurate grasping of an object of an arbitrary shape.

11 Claims, 9 Drawing Sheets

HAND CONTROL SYSTEM, METHOD, PROGRAM, HAND, AND ROBOT

BACKGROUND OF THE INVENTION

1. Field of the Invention

The present invention relates to a system that controls a grasping operation of an object by a hand provided extensionally from a base and having a plurality of finger mechanisms capable of bending and stretching, a control method for the same, a program that causes a computer to function as the control system, a hand as an object to be controlled, and a robot having the control system and the hand.

2. Description of the Related Art

There has been proposed a robot hand for grasping an object of an arbitrary shape in consideration of a variety of shapes of objects (works) to be grasped and others (see, for example, Japanese Patent Laid-Open No. 2005-007486). According to this hand, the joint angles of a plurality of finger mechanisms are controlled such that arbitrary points at the tip ends of the finger mechanisms and the normal lines substantially coincide with a plurality of target contact points set on an object of an arbitrary shape and the normal vectors, respectively.

In the case where actuators are provided respectively for a plurality of joints of the finger mechanisms, however, the number of electric wires and control signal lines connected to the actuators become large. In order to secure a space for wiring in a casing of the finger mechanism, the size of the casing inevitably increases, and the plurality of finger mechanisms may interfere with each other, hindering free movement thereof. On the other hand, simplifying the structures of the finger mechanisms leads to simple motions thereof, making it difficult to grasp an object of an arbitrary shape with the hand.

SUMMARY OF THE INVENTION

In view of the foregoing, an object of the present invention is to provide a system that controls a hand such that it can accurately grasp an object of an arbitrary shape, while simplifying the structures of the finger mechanisms, the control method, a program that causes a computer to function as the control system, a hand to be controlled, and a robot provided with the control system and the hand.

To achieve the above-described object, a hand control system according to a first aspect of the invention is a system controlling a grasping operation of an object by a hand extended from a base and having a plurality of finger mechanisms capable of bending and stretching, which system includes: a first processor recognizing part or all of size, shape, position, and posture of the object, and recognizing an object reference point and an i-th (i=1, 2, . . . ) object reference vector having the object reference point as a starting point in accordance with the recognized information; a second processor recognizing position and posture of the base and bending posture of a specified finger mechanism from among the plurality of finger mechanisms, and recognizing a hand reference point and an i-th hand reference vector having the hand reference point as a starting point in accordance with the recognized information; a third processor controlling the position and posture of the base such that the object reference point and the i-th object reference vector recognized by the first processor and the hand reference point and the i-th hand reference vector recognized by the second processor come close to each other, respectively; and a fourth processor gradually changing the bending posture of the specified finger mechanism during the controlling process of the position and posture of the base by the third processor.

According to the hand control system of the first aspect of the invention, the position and posture of the base are controlled such that the "object reference point" and the "hand reference point" come close to each other and such that the "i-th object reference vector" and the "i-th hand reference vector" come close to each other. The object reference point and the i-th object reference vector correspond to part or all of the size, shape, position, and posture of the object. The hand reference point and the i-th hand reference vector correspond to the position and posture of the base and the posture of a specified finger mechanism from among the plurality of finger mechanisms. In this manner, the position and posture of the base are controlled appropriately in accordance with the size of the object and the like, from the standpoint of grasping the object by the specified finger mechanism. Further, the object can be grasped only by controlling the operation of the specified finger mechanism such that the bending posture of the specified finger mechanism gradually changes (for example, such that the degree of bending gradually increases) during the controlling process of the position and posture of the base. Furthermore, the control to gradually change the bending posture of the specified finger mechanism is simple compared to the posture control of each finger mechanism for causing the fingertip position to coincide with a target position of the object, and therefore, the structures of the finger mechanisms can be simplified correspondingly. That is, an object of an arbitrary shape can be grasped even in the case of employing a simple configuration as the configuration of the finger mechanisms of the hand, without provision of the actuators for the respective joints of the hand that would have been provided in the conventional technique.

As such, according to the hand control system of the first aspect of the invention, it is possible to accurately grasp an object of an arbitrary shape while simplifying the structures of the finger mechanisms.

It is noted that certain means which is a constituent element of the present invention "recognizes" information refers to a concept involving various processing of the means such as: reading information from a storage device such as a memory or the like; receiving the information from an external information source; measuring, setting, estimating, and calculating the information based on an output from a sensor and the like by arithmetic processing; storing the measured information and others in a memory; and any other processing for preparing the information for further information processing using the relevant information.

The hand control system according to a second aspect of the invention is characterized in that, in the hand control system of the first aspect of the invention, the fourth processor gradually changes the bending posture of the specified finger mechanism when one or both of a distance between the object reference point and the hand reference point and an angle between the i-th object reference vector and the i-th hand reference vector attain a value within a range corresponding to part or all of the size, shape, position, and posture of the object recognized by the first processor.

According to the hand control system of the second aspect of the invention, the timing of changing the bending posture of the specified finger mechanism is set appropriately in consideration of part or all of the size, shape, position, and posture of the object, which makes it possible to grasp the object while ensuring smooth operation of the specified finger mechanism. For example, when the object is small, it is controlled such that the bending posture of the specified finger mechanism is started to change at a time point when the hand (or the hand reference point) is still far from the object (or the object reference point), in which case the degree of closing or opening of the hand (the bending posture of the specified finger mechanism) when the hand comes in the close vicinity of the object can be rendered appropriate in consideration of the size of the object. On the other hand, when the object is large, it is controlled such that the bending posture of the specified finger mechanism is started to change at a time point when the hand is near the object, to attain an appropriate degree of closing or opening of the hand when the hand comes in the close vicinity of the object in consideration of the size of the object. As such, a wasteful operation of the specified finger mechanism, causing the hand to close and open again, can be eliminated.

Further, the hand control system according to a third aspect of the invention is characterized in that, in the hand control system of the first aspect of the invention, when the first processor recognizes a plate shape as the shape of the object, the first processor sets the object reference point at a center of the object of the plate shape, sets a unit normal vector of the plate as a first object reference vector ($i=1$), and sets a unit tangent vector of the plate as a second object reference vector ($i=2$), and the second processor measures as the hand reference point a center of a triangle having a tip end portion of the specified finger mechanism and tip end portions of the finger mechanisms opposing the specified finger mechanisms as vertices, measures a unit normal vector of a plane including the triangle as a first hand reference vector ($i=1$), and measures a unit tangent vector of the plane as a second hand reference vector ($i=2$).

According to the hand control system of the third aspect of the invention, it is possible to accurately grasp an object of a plate shape.

The hand control system according to a fourth aspect of the invention is characterized in that, in the hand control system of the first aspect of the invention, when the first processor recognizes a stick shape as the shape of the object, the first processor sets the object reference point on a trajectory surrounding the object of the stick shape, sets a unit tangent vector of the trajectory as a first object reference vector ($i=1$), and sets a unit binormal vector of the trajectory as a second object reference vector ($i=2$), and the second processor measures a point on a rotational axis of the specified finger mechanism as the hand reference point, measures a unit vector orthogonal to the rotational axis and directed to a tip end portion of the specified finger mechanism as a first hand reference vector ($i=1$), and measures a unit vector in a direction of the rotational axis as a second hand reference vector ($i=2$).

According to the hand control system of the fourth aspect of the invention, it is possible to accurately grasp an object of a stick shape or an object having a stick-shaped portion.

Further, the hand control system according to a fifth aspect of the invention is characterized in that, in the hand control system of the first aspect of the invention, the third processor controls the posture of the base using a quaternion such that the i-th hand reference vector comes close to the i-th object reference vector.

According to the hand control system of the fifth aspect of the invention, the relative rotations of the i-th object reference vector and the i-th hand reference vector are represented (arithmetically processed) by using quaternions. This enables control of the posture of the base in a shortest period of time (or moving distance) while effecting spherical linear interpolation about a certain axis. Accordingly, a wasteful operation of the base can be avoided, and the possibility that the base would contact an object that is present nearby but not the one to be grasped is reduced considerably. Further, it is possible to cause the base to approach the object to be grasped from an appropriate direction. Still further, gimbal lock (phenomenon as in the case that "a dish placed at the center of a round table will not come closer to the circumference even if the round table is rotated" and the like, in which effective degree of freedom or dimension would be lost) can be prevented reliably. Furthermore, the rotation can be described with only four numerical values, which can save the memory and other resources for the arithmetic processing compared to the case of the affine transformation matrix method and the like.

Further, the hand control system according to a sixth aspect of the invention is characterized in that, in the hand control system of the first aspect of the invention, it controls a grasping operation of an object by the hand attached to an end of an arm extended from an upper part of a base of a legged mobile robot capable of moving by operations of a plurality of legs extended from a lower part of the base.

According to the hand control system of the sixth aspect of the invention, even in the case where it is difficult to grasp an object with only the control of posture of the arm (with which the position of the base is determined) and the posture of the base, the robot can change the position and posture of the base with respect to the object by virtue of the operations of the legs, which makes it possible to readily achieve the state where the object is grasped with the hand through the control of the postures of the arm and the base.

Further, the hand control system according to a seventh aspect of the invention is characterized in that, in the hand control system of the first aspect of the invention, part or all of the first processor, the second processor, the third processor, and the fourth processor are configured with a same processor.

To achieve the above-described object, the method according to an eighth aspect of the invention is a method for controlling a grasping operation of an object by a hand extended from a base and having a plurality of finger mechanisms capable of bending and stretching, which method implements: a first process of recognizing part or all of size, shape, position, and posture of the object, and recognizing an object reference point and an i-th ($i=1, 2, \ldots$) object reference vector having the object reference point as a starting point in accordance with the recognized information; a second process of recognizing position and posture of the base and bending posture of a specified finger mechanism from among the plurality of finger mechanisms, and recognizing a hand reference point and an i-th hand reference vector having the hand reference point as a starting point in accordance with the recognized information; a third process of controlling the position and posture of the base such that the object reference point and the i-th object reference vector recognized in the first process and the hand reference point and the i-th hand reference vector recognized in the second process come close to each other, respectively; and a fourth process of gradually changing the bending posture of the specified finger mechanism during the control of the position and posture of the base in the third process.

To achieve the above-described object, the program according to a ninth aspect of the invention is a program causing a computer to function as a system that controls a grasping operation of an object by a hand extended from a base and having a plurality of finger mechanisms capable of bending and stretching, wherein the computer is caused to function as the hand control system of the first aspect of the invention.

The hand according to a tenth aspect of the invention is characterized in that its grasping operation of an object is controlled by the hand control system of the first aspect of the invention.

The robot according to an eleventh aspect of the invention is characterized in that it includes the hand control system of the sixth aspect of the invention and the hand, the grasping operation of an object of which is controlled by the relevant control system.

DESCRIPTION OF THE PREFERRED EMBODIMENTS

An embodiment of the hand control system of the present invention will now be described with reference to the drawings.

Figure 1:
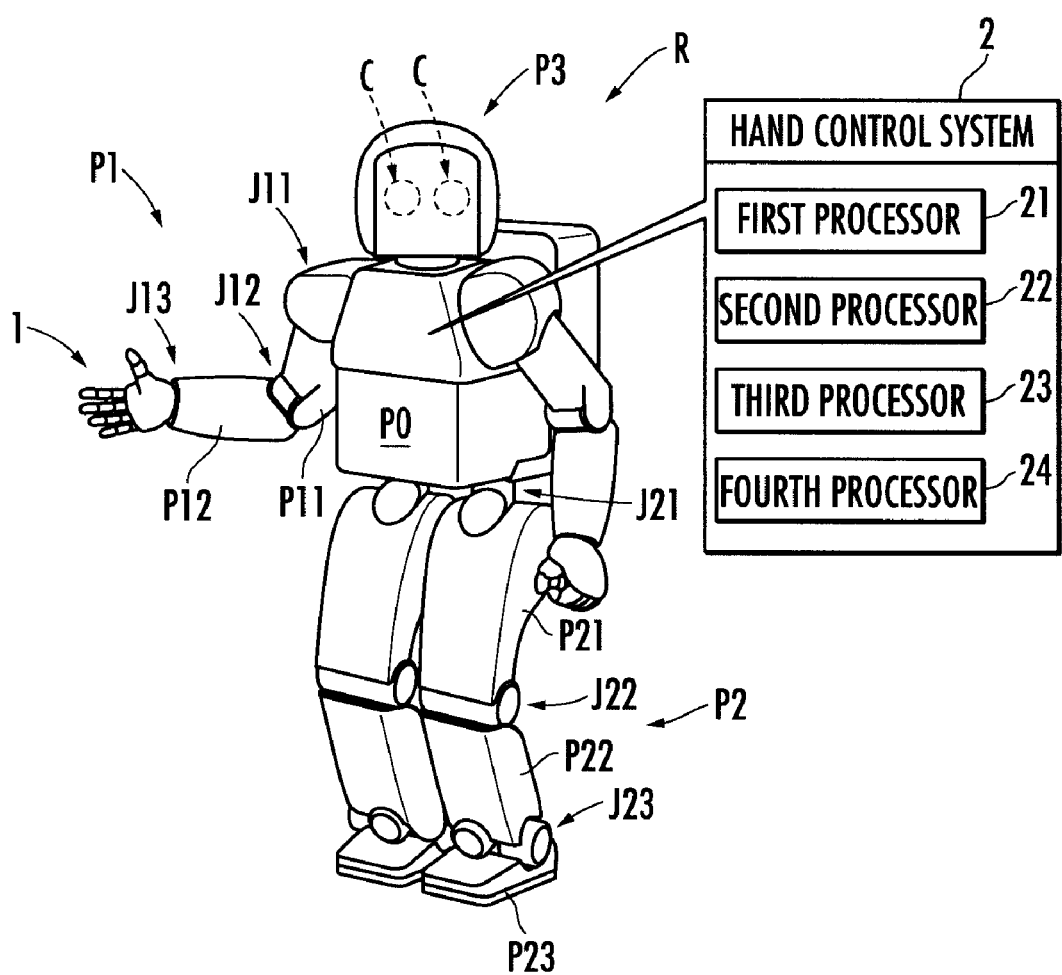
FIG. 1 shows by way of example a configuration of a robot provided with a hand control system.

The robot R shown in FIG. 1 is a legged mobile robot, which includes, similarly to a human being, a body P0, left and right arms P1 extended from the respective sides of the body P0, a hand 1 provided at an end of each of the left and right arms P1, left and right legs P2 extended downward from a lower part of the body P0, a head P3 provided on top of the body P0, a pair of left and right CCD cameras C arranged at the head P3 and capturing the scenery in front, and a hand control system 2 configured with a CPU, a memory such as a ROM, RAM or the like, a signal input circuit, a signal output circuit and the like, and controlling the operation of the robot R.

The body P0 has an upper part and a lower part joined above and below in a manner allowing relative rotation about a yaw axis.

The arm P1 has a first arm link P11 and a second arm link P12. The body P0 and the first arm link P11 are joined via a shoulder joint J11, the first arm link P11 and the second arm link P12 are joined via an elbow joint J12, and the second arm link P12 and the hand 1 are joined via a carpal joint J13. The shoulder joint J11 has rotational degrees of freedom about the roll, pitch and yaw axes, the elbow joint J12 has a rotational degree of freedom about the pitch axis, and the carpal joint J13 has rotational degrees of freedom about the roll, pitch and yaw axes.

The leg P2 has a first leg link P21, a second leg link P22, and a foot P23. The body P0 and the first leg link P21 are joined via a hip joint J21, the first leg link P21 and the second leg link P22 are joined via a knee joint J22, and the second leg link P22 and the foot P23 are joined via an ankle joint J23. The hip joint J21 has rotational degrees of freedom about the roll, pitch and yaw axes, the knee joint J22 has a rotational degree of freedom about the pitch axis, and the ankle joint J13 has rotational degrees of freedom about the roll and pitch axes.

The head P3 is capable of moving in various ways, including rotation about the yaw axis with respect to the body P0.

Figure 2:
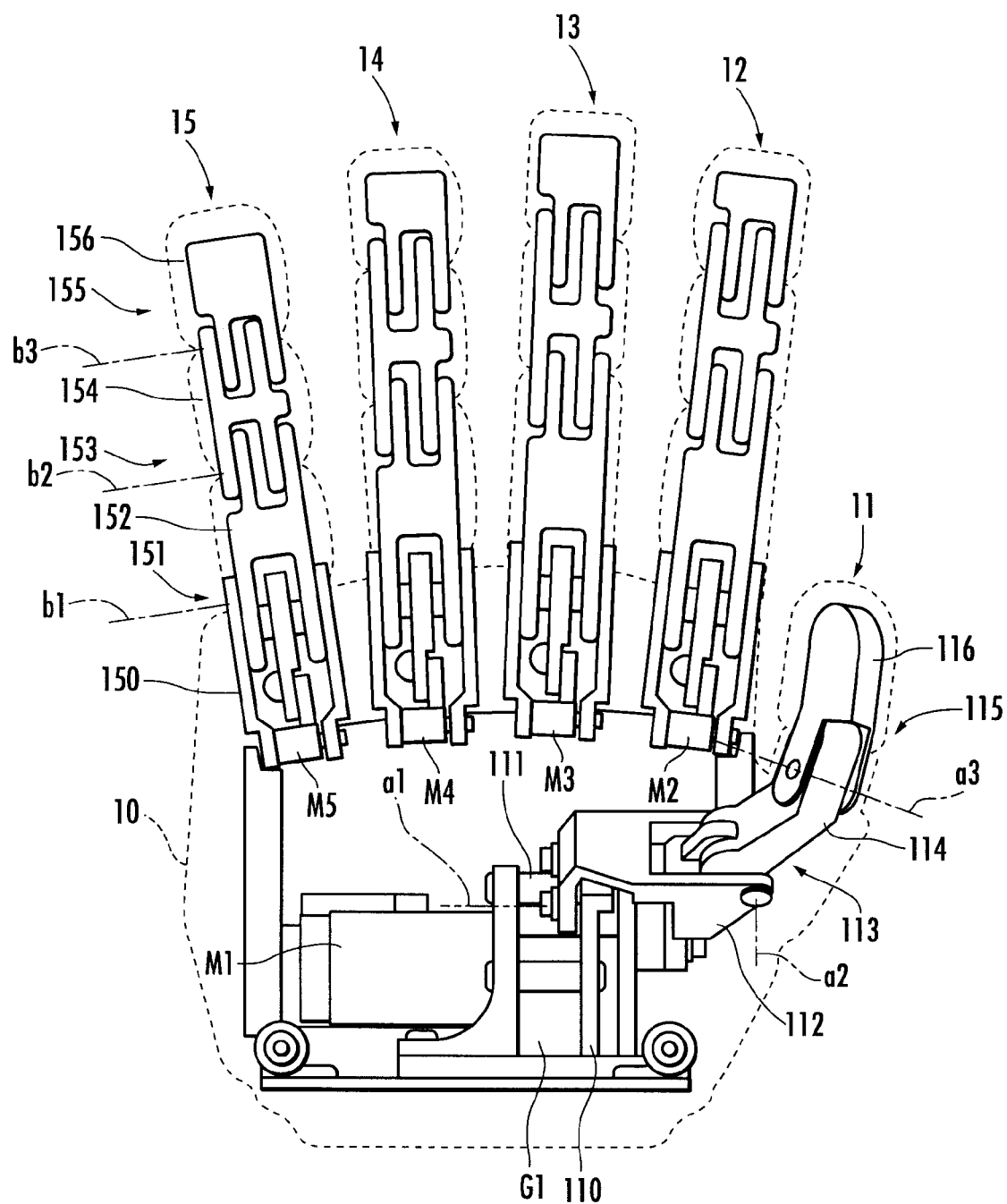
FIG. 2 shows by way of example a configuration of a hand.

The hand 1 includes a palm 10, and a first finger mechanism 11, a second finger mechanism 12, a third finger mechanism 13, a fourth finger mechanism 14, and a fifth finger mechanism 15 extended from the palm 10, as shown in FIG. 2. The first finger mechanism 11, the second finger mechanism 12, the third finger mechanism 13, the fourth finger mechanism 14, and the fifth finger mechanism 15 correspond to the thumb, index finger, middle finger, ring finger, and little finger, respectively, of the human hand. The first finger mechanism 11 is arranged such that its inner side can face the inner sides of the other finger mechanisms 12-15. The four finger mechanisms 12-15 are arranged in parallel in the lateral direction.

The first finger mechanism 11 has a first link element 112, a second link element 114, a third link element 116, and a finger cover of a shape as indicated by a broken line. The first link element 112, the second link element 114, and the third link element 116 correspond respectively to the first metacarpal bone, the proximal phalanx and the distal phalanx of the thumb of the human hand. The first link element 112 is joined via a first joint 111 to a base 110 mounted to the palm 10 in a state rotatable about a first axis a1 with respect to the base 110. The base 110 may be fixedly secured to the palm 10, or may be movably mounted to the palm 10. The second link element 114 is joined via a second joint 113 to the first link element 112 in a state rotatable about a second axis a2 with respect to the first link element 112. The third link element 116 is joined via a third joint 115 to the second link element 114 in a state rotatable about a third axis a3 with respect to the second link element 114. The first joint 111, the second joint 113 and the third joint 115 correspond respectively to the joint of the first metacarpal bone on the base side, the metacarpophalangeal joint and the interphalangeal joint of the thumb of the human hand. The first axis a1 is approximately parallel to the direction in which the finger mechanisms 12-15 are arranged (the left and right direction in FIG. 2), the second axis a2 intersects with and is at a distance from the first axis a1, and the third axis a3 intersects with and is at a distance from the second axis a2.

The first finger mechanism 11 can bend at each of the first joint 111, the second joint 113 and the third joint 115 in accordance with the power transmitted from a first motor M1 housed in the palm 10 via a power transmission mechanism configured with a first speed reduction mechanism G1 and the like. The power transmitted from the first motor M1 to the first finger mechanism 11 is controlled by the hand control system 2.

The finger mechanisms 12-15 are allowed to bend and stretch independently from each other, and are approximately identical in configuration, similarly as in the case of the finger mechanisms described, e.g., in Japanese Patent Laid-Open No. 2001-347482. For example, the fifth finger mechanism 15 has a first link element 152, a second link element 154, a third link element 156, and a finger cover of a shape as indicated by a broken line. The first link element 152, the second link element 154, and the third link element 156 correspond respectively to the proximal phalanx, the middle phalanx, and the distal phalanx of the little finger of the human hand. The first link element 152 is joined via a first joint 151 to a base 150 arranged at the palm 10 in a state rotatable about a first axis b1 with respect to the base 150. The base 150 may be fixedly secured to the palm 10, or may be movable with respect to the palm 10. The second link element 154 is joined via a second joint 153 to the first link element 152 in a state rotatable about a second axis b2 with respect to the first link element 152. The third link element 156 is joined via a third joint 155 to the second link element 154 in a state rotatable about a third axis b3 with respect to the second link element 154. The first joint 151, the second joint 153, and the third joint 155 correspond respectively to the metacarpophalangeal joint, the proximal interphalangeal joint, and the distal interphalangeal joint of the little finger of the human hand. The first axis b1, the second axis b2 and the third axis b3 are approximately parallel to the direction in which the finger mechanisms 12-15 are arranged (the left and right direction in FIG. 2).

The fifth finger mechanism 15 can bend inward at each of the first joint 151, the second joint 153 and the third joint 155 in accordance with the power transmitted from a fifth motor M5 housed in the palm 10 via a power transmission mechanism including a speed reduction device and the like. The power transmitted from the fifth motor M5 to the fifth finger mechanism 15 is controlled by the hand control system 2, similarly as in the case of the first finger mechanism 11.

The second finger mechanism 12, the third finger mechanism 13 and the fourth finger mechanism 14 each have a configuration similar to the above-described configuration of the fifth finger mechanism 15, and thus, description thereof will not be repeated.

It is noted that two or more finger mechanisms among the finger mechanisms 11-15 may be driven by one motor, as described in Japanese Patent Laid-Open No. 2003-181787. Further, the power transmission mechanism may be configured with wire, pulley and the like, as described in the same publication, or any other configuration may be employed as long as it can transmit the power of the motor to allow bending and stretching motions of each finger mechanism.

The hand control system 2 has a first processor 21, a second processor 22, a third processor 23, and a fourth processor 24, as shown in FIG. 1.

The first processor 21 measures "size", "shape", "position", and "posture" of an object in front of the head P3, based on data picked up by the pair of CCD cameras C. Further, the first processor 21 calculates an "object reference point" and a plurality of "object reference vectors" having the object reference point as their starting points, in accordance with the size, shape, position, and posture of the object.

The second processor 22 measures (recognizes) a position of the palm (base) 10 of the hand 1 and bending postures of the plurality of finger mechanisms 11-15, based on an output of a rotary encoder (not shown) corresponding to a joint angle of the robot R and the data picked up by the CCD cameras C. Further, the second processor 22 recognizes a "hand reference point" and a plurality of "hand reference vectors" having the hand reference point as their starting points in accordance with the position and posture of the palm 10 and the bending posture of a specified finger mechanism (as will be described later) from among the plurality of finger mechanisms 11-15.

The third processor 23 controls the position and posture of the palm (base) 10 such that the object reference point and the i-th (i=1, 2, ...) object reference vector recognized by the first processor 21 and the hand reference point and the i-th hand reference vector recognized by the second processor 22 come close to each other, respectively.

The fourth processor 24 gradually changes the bending postures of the plurality of finger mechanisms 11-15 during the controlling process of the position and posture of the palm 10 by the third processor 23.

According to the hand control system 2 having the configuration described above, as shown in FIG. 4, the robot R can grasp a plate-shaped object (work) w rested on a work table D with the hand 1, by gradually increasing the degree of bending of a specified finger mechanism (see the black arrow) while moving the right arm P1 (and the leg P2 if necessary) (see the white arrow). Further, as shown in FIG. 7, the robot R can grasp a cup (of which handle corresponds to a stick-shaped object) w rested on a work table D with the hand 1, by gradually increasing the degree of bending of a specified finger mechanism (see the black arrow) while moving the right arm P1 (see the white arrow). This control procedure will now be described with reference to FIGS. 3-6, 8 and 9.

Figure 3:
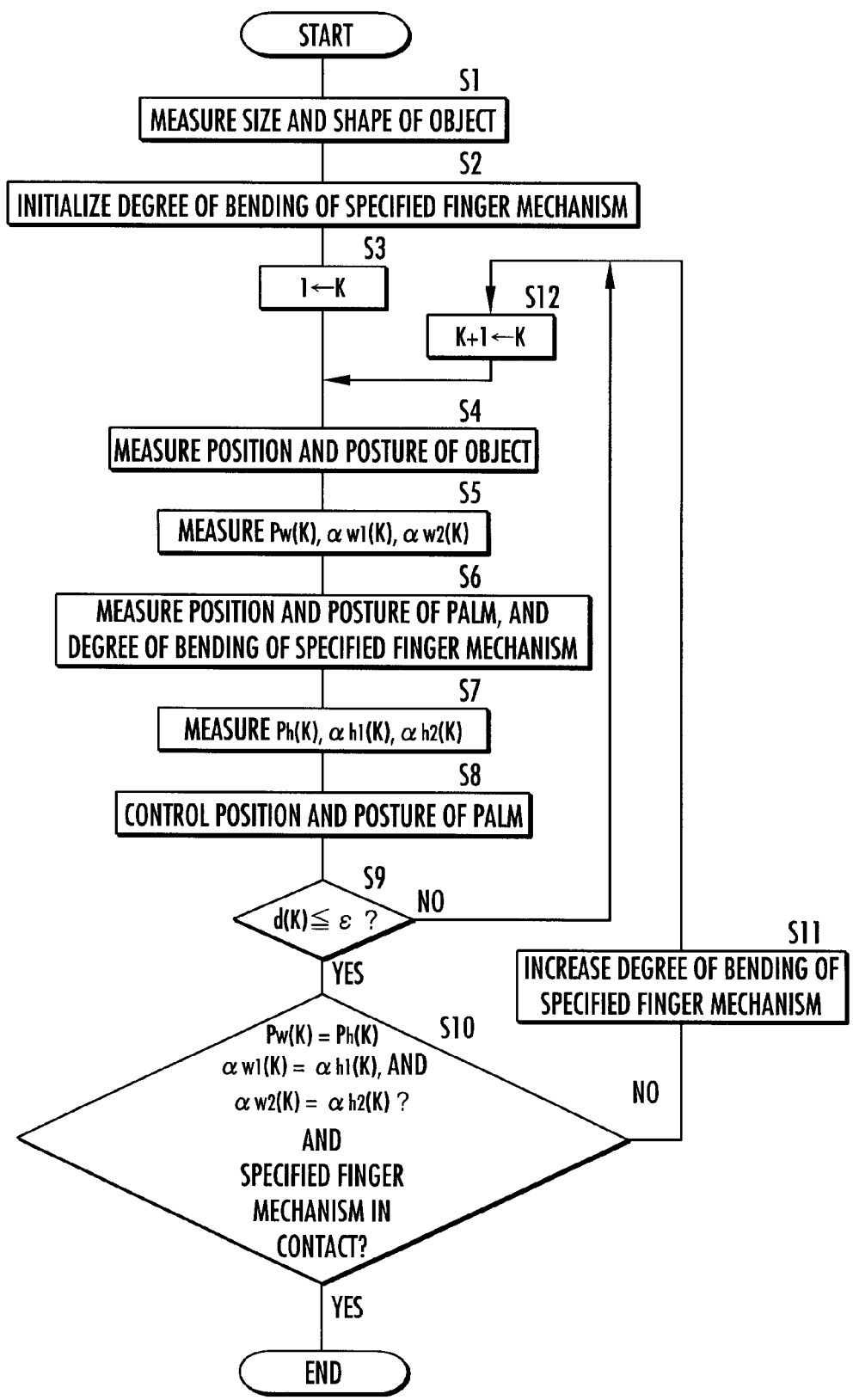
FIG. 3 shows by way of example a function of the hand control system.
Figure 4:
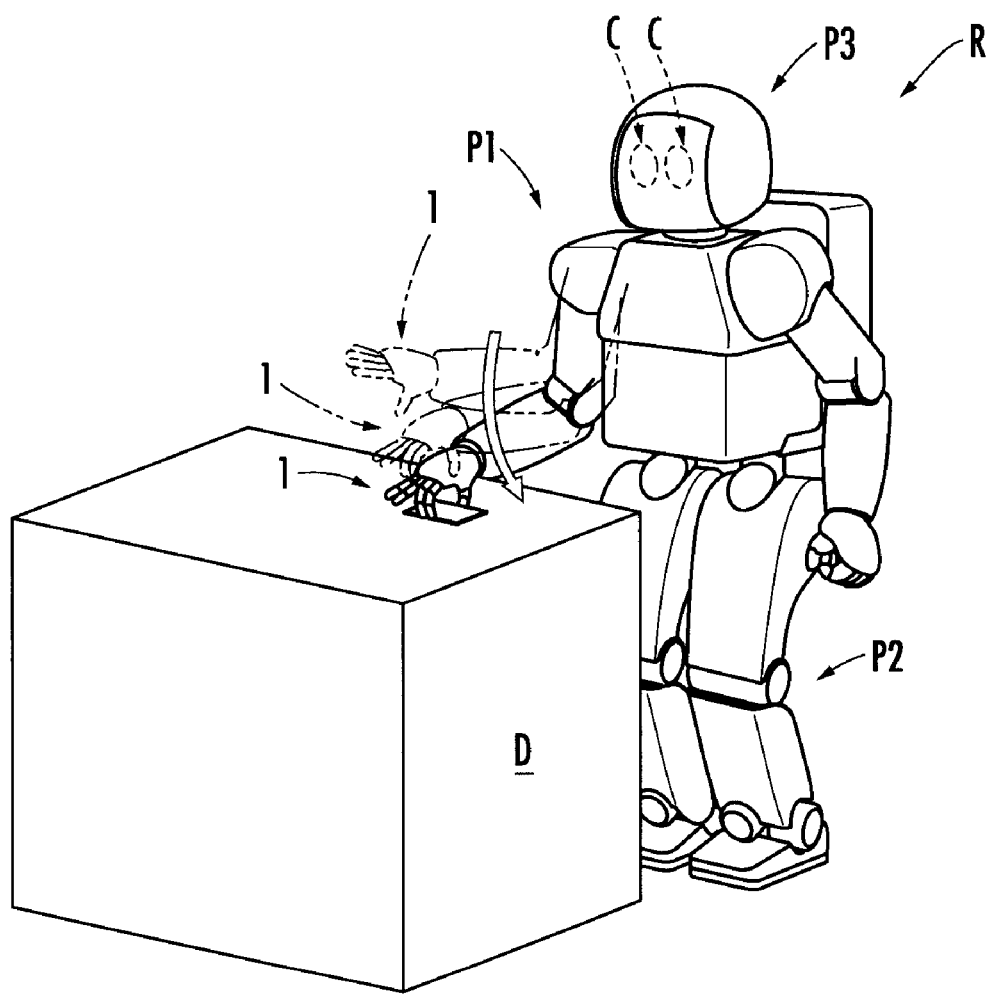
FIGS. 4-6 show by way of example a function of the hand control system (first example of an object).

Firstly, the first processor 21 measures the "size" and "shape" of the object w to be grasped positioned in front of the head P3, by the image processing based on the data picked up by the pair of CCD cameras C (FIG. 3; S1). The image processing may include binarization and the like, with which the contour (edge) of the object w can be extracted from the picked-up data. The size of the object w is measured based on the number of pixels (area) of the object w within the range picked up by the CCD cameras C, the distance to the object w in accordance with the parallax of the left and right CCD cameras C, and the like. The shape of the object w is measured based on the contour of the object w. For example, the shape of the object w is measured by comparing the contour of the object w with each of a plurality of patterns stored in a memory (pattern matching). It is noted that a reader (not shown) provided in the robot R may be used to read one or both of the "size" and "shape" of the object w from a barcode or RFID attached to or placed in the vicinity of the object w to allow the first processor 21 to recognize the size and others of the object w.

Figure 5A:
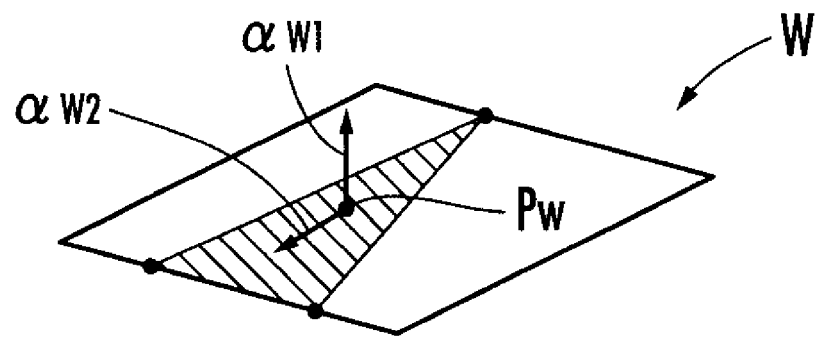
Figure 5B:
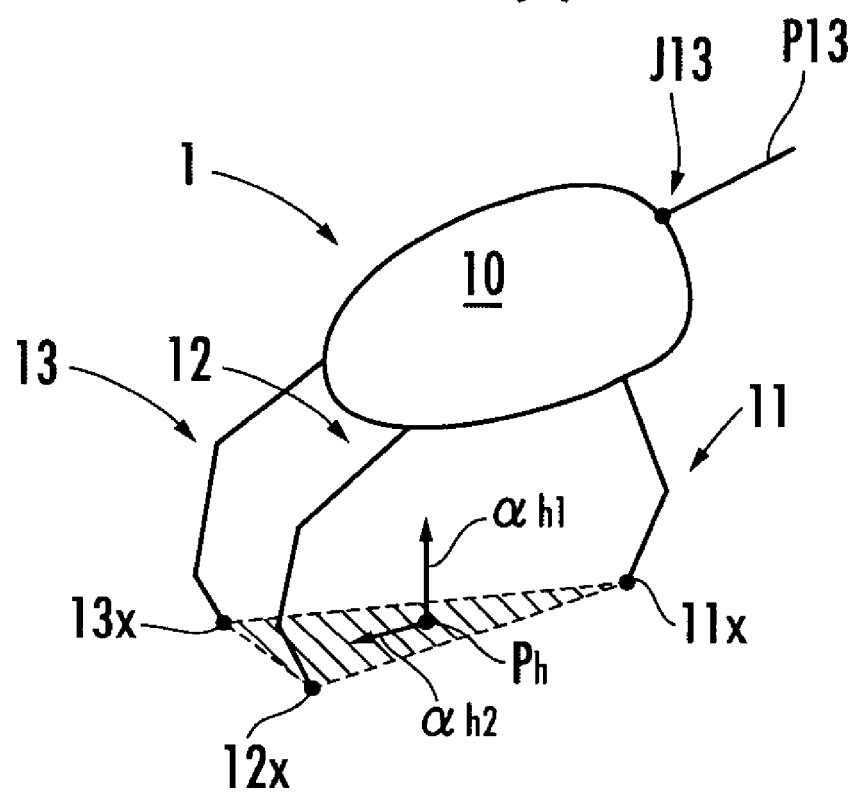

Next, the fourth processor 24 specifies a finger mechanism corresponding to the measured shape (and size) of the object w, from among the plurality of finger mechanisms 11-15, and initializes the bending posture of the specified finger mechanism (FIG. 3; S2). With this process, for example when the first finger mechanism 11 is the specified finger mechanism, the posture of the first finger mechanism 11 is controlled such that the bending angle of its third joint 115 becomes zero (or a minute angle δ). When the second finger mechanism 12 corresponds to the specified finger mechanism, the posture of the second finger mechanism 12 is controlled such that the bending angle of each of the first joint 121, the second joint 123 and the third joint 125 becomes zero (or a minute angle δ). When the third finger mechanism 13, the fourth finger mechanism 14 or the fifth finger mechanism 15 corresponds to the specified finger mechanism, its posture is controlled in a similar manner as in the case where the second finger mechanism 12 is the specified finger mechanism. When the object w is of a plate shape as shown in FIG. 5(a), the fourth processor 24 defines the first finger mechanism 11, the second finger mechanism 12 and the third finger mechanism 13 as the specified finger mechanisms, and initializes the bending posture of each of the specified finger mechanisms. When the object (handle of the cup) w is of a stick shape as shown in FIG. 5(b), the fourth processor 24 defines the second finger mechanism 12 (or any one or more finger mechanisms from among the finger mechanisms 11-15, such as the finger mechanisms 12 and 13, or the finger mechanisms 12, 13 and 14, and the like) as the specified finger mechanism, and initializes the bending posture of the specified finger mechanism as described above.

After initialization of the degree of bending of the specified finger mechanism, an index k representing the control cycle is set to "1" (FIG. 3; S3), and the first processor 21 measures the "position" and "posture" of the object w positioned in front of the head P3 by the above-described image processing (FIG. 3; S4). The position of the object w (position of an object reference point $P_w(k)$, which will be described later) is measured as a position in the robot coordinate system having an arbitrary point such as the center of gravity of the robot R as the origin. The position of the object w in the robot coordinate system is obtained based on the distance of the object w from the CCD cameras C, the rotational angle of the head P3 with respect to the body P0, the yaw rotational angles (twist angles) of the upper and lower parts of the body P0, and others. Although a point that does not move during the grasping operation of the object w may be adopted as the origin of the robot coordinate system, a point that moves during the relevant operation may also be adopted, in which case the position of the object w in the robot coordinate system may be corrected successively in response to the movement thereof. The size of the object w is measured based on the number of pixels (area) of the object w within the range picked up by the CCD cameras C, the distance to the object w in accordance with the parallax of the left and right CCD cameras C, and others. The size of the object w is measured for example by comparing the contour of the object w with each of a plurality of patterns stored in a memory (pattern matching).

Further, the first processor 21 measures an object reference point $P_w(k)$, a first object reference vector $\alpha_{w1}(k)$, and a second object reference vector $\alpha_{w2}(k)$, in accordance with the measured position and posture (and additionally the measured size and shape if necessary) of the object w (FIG. 3; S5).

For example, when the object w is of a plate shape as shown in FIG. 5(a), the first processor 21 sets the center of a triangle (shaded portion) having three points on a rim of the object was the vertices as the object reference point $P_w(k)$. Further, as shown in FIG. 5(a), the first processor 21 sets, as the first object reference vector $\alpha_{w1}(k)$, a unit normal vector of (the upper surface of) the object w of which starting point corresponds to the object reference point $P_w(k)$, and sets, as the second object reference vector $\alpha_{w2}(k)$, a unit vector (unit tangent vector of the plate w) of which starting point corresponds to the object reference point $P_w(k)$ and parallel to a direction of the perpendicular line which extends from the center of the relevant triangle toward one of the three sides of the triangle closest to the rim of the object w.

It is noted that when the position of the object w in the robot coordinate system is constant because the object w is stationary or the like, the object reference point $P_w(k)$ is constant as well (that is, $P_w(k+1)=P_w(k)$). Further, when the posture of the object w in the robot coordinate system is constant, the first object reference vector $\alpha_{w1}(k)$ and the second object reference vector $\alpha_{w2}(k)$ are also contact (that is, $\alpha_{w1}(k+1)=\alpha_{w1}(k)$, $\alpha_{w2}(k+1)=\alpha_{w2}(k)$). In such a case, it may be possible to skip the measurement (S4) of the position and posture of the object and the measurement (S5) of the object reference point $P_w(k)$, the first object reference vector $\alpha_{w1}(k)$ and the second object reference vector $\alpha_{w2}(k)$ in the control cycle k ($\geq 2$).

On the other hand, when the position of the object w in the robot coordinate system changes because one or both of the object w and the robot R are moving or the like, the object reference point $P_w(k)$ changes as well (that is, $P_w(k+1) \neq P_w(k)$). When the posture of the object w in the robot coordinate system changes, the first object reference vector $\alpha_{w1}(k)$ and the second object reference vector $\alpha_{w2}(k)$ change as well (that is, $\alpha_{w1}(k+1) \neq \alpha_{w1}(k)$, $\alpha_{w2}(k+1) \neq \alpha_{w2}(k)$).

Figure 8A:
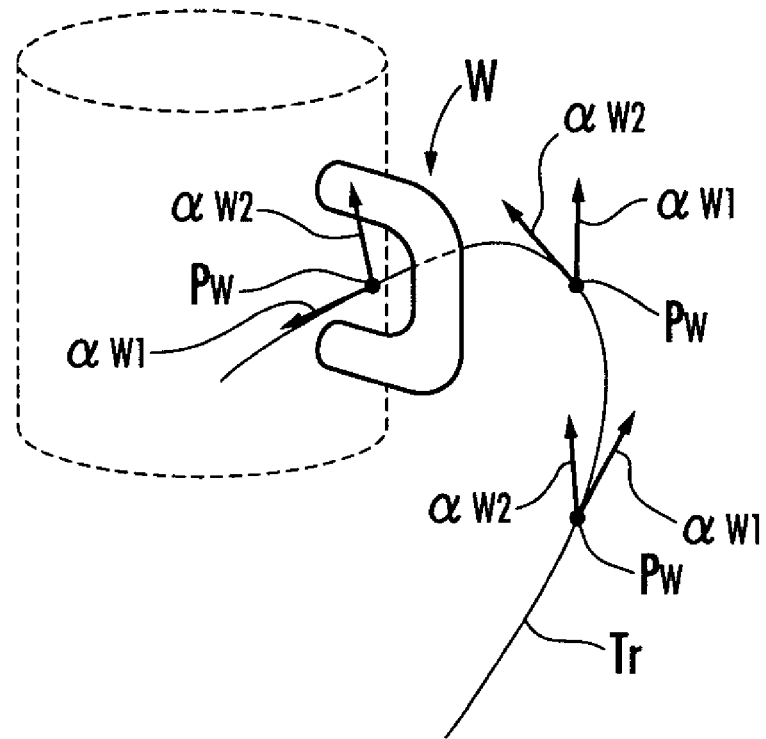

When the object w is of a stick shape as shown in FIG. 8(a), the first processor 21 sets a point on a trajectory tr surrounding the object was the object reference point $P_w(k)$. Further, as shown in FIG. 8(a), the first processor 21 sets a unit tangent vector of the trajectory tr of which starting point corresponds to the object reference point $P_w(k)$ as the first object reference vector $\alpha_{w1}(k)$, and sets a unit binormal vector of the trajectory tr of which starting point corresponds to the object reference point $P_w(k)$ as the second object reference vector $\alpha_{w2}(k)$.

The second processor 22 measures the position and posture of the palm 10, and the bending posture of the specified finger mechanism (FIG. 3; S6). The position of the palm 10 is measured as the position of the carpal joint J13 in the robot coordinate system, based on the length of the first arm link P11, the length of the second arm link P12, the rotational angle of the shoulder joint J11, the rotational angle of the elbow joint J12, and the like. The posture of the palm 10 is measured as the rotational angles of the palm 10 about the X, Y and Z axes, respectively, in the robot coordinate system, based on the rotational angle of the carpal joint J13 and the like. The degree of bending of the specified finger mechanism is measured in accordance with the bending angle(s) of the joint(s) of the specified finger mechanism.

Furthermore, the second processor 22 measures a hand reference point $P_h(k)$, a first hand reference vector $\alpha_{h1}(k)$, and a second hand reference vector $\alpha_{h2}(k)$ in the control cycle k, based on the measured position and posture of the palm 10 and the measured bending posture of the specified finger mechanism (FIG. 3; S7).

For example, when the object w is of a plate shape as shown in FIG. 5(a), the center of the triangle (shaded portion delimited by the broken line) having the fingertip positions (hereinafter, referred to as "first fingertip position", "second fingertip position" and "third fingertip position") 11x-13x of the respective specified finger mechanisms 11-13 as the vertices, as shown in FIG. 5(b), is measured as the hand reference point $P_h(k)$. In the case where the incenter or the circumcenter of the above-described triangle having three points on the rim of the object w as the vertices is set as the object reference point $P_w(k)$, the incenter or the circumcenter of the triangle having the fingertip positions 11x-13x as the vertices may be measured as the hand reference point $P_h(k)$. Further, a unit vector having the hand reference point $P_h(k)$ as the starting point and parallel to an outer product of two vectors directed from the first fingertip position 11x to the second fingertip position 12x and the third fingertip position 13x, respectively, is measured as the first hand reference vector $\alpha_{h1}(k)$ (see FIG. 5(b)). Furthermore, a unit vector having the hand reference point $P_h(k)$ as the starting point and parallel to a vector directed from the first fingertip position 11x to the middle point of the second fingertip position 12x and the third fingertip position 13x is measured as the second hand reference vector $\alpha_{h2}(k)$ (see FIG. 5(b)).

Figure 8B:
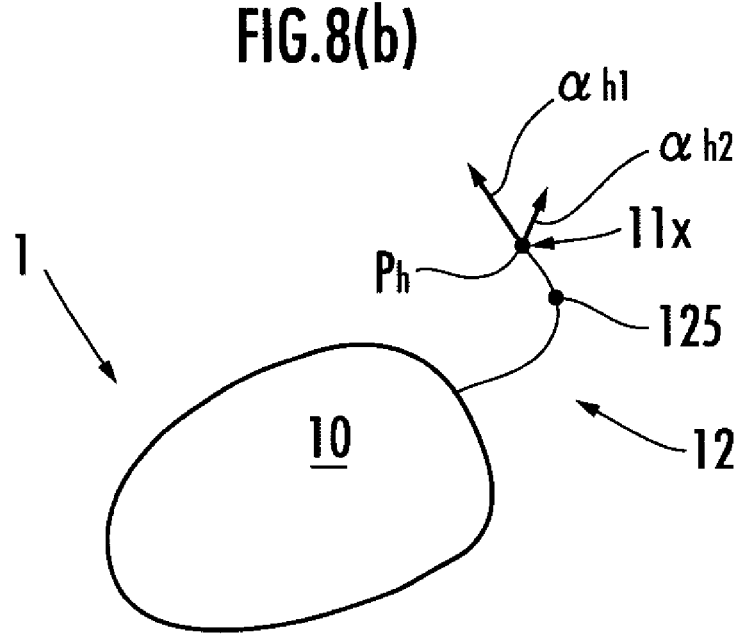

When the object w is of a stick shape as shown in FIG. 8(a), the second fingertip position 12x is measured as the hand reference point $P_h(k)$, as shown in FIG. 8(b). Further, a unit vector having the hand reference point $P_h(k)$ as the starting point and parallel to a vector directed from the third joint 125 of the second finger mechanism 12 (see FIG. 2) to the second fingertip position 12x is measured as the first hand reference vector $\alpha_{h1}(k)$ (see FIG. 8(b)). Furthermore, a unit vector having the hand reference point $P_h(k)$ as the starting point and parallel to the rotational axis of the third joint 125 of the second finger mechanism 12 is measured as the second hand referenced vector $\alpha_{h2}(k)$ (see FIG. 8(b)). It may also be possible that the position of the third joint 125 of the second finger mechanism 12 is measured as the hand reference point $P_h(k)$, that a unit vector directed from this hand reference point $P_h(k)$ toward the second fingertip position 12x is measured as the first hand reference vector $\alpha_{h1}(k)$, and that a unit vector having the hand reference point $P_h(k)$ as the starting point and positioned on the rotational axis of the third joint 125 of the second finger mechanism 12 is measured as the second hand reference vector $\alpha_{h2}(k)$.

Next, the third processor 23 controls the position and posture of the palm 10 such that the respective ones of the object reference point $P_w(k)$, the first object reference vector $\alpha_{w1}(k)$ and the second object reference vector $\alpha_{w2}(k)$ measured by the first processor 21 and the respective ones of the hand reference point $P_h(k)$, the first hand reference vector $\alpha_{h1}(k)$ and the second hand reference vector $\alpha_{h2}(k)$ measured by the second processor 22 come close to each other (FIG. 3; S8). Specifically, the third processor 23 carries out the control processing as follows.

Firstly, the position of the palm 10 is controlled such that the hand reference point $P_h(k)$ (=$(x_h(k), y_h(k), z_h(k))$) comes close to the object reference point $P_w(k)$ (=$(x_w(k), y_w(k), z_w(k))$). More specifically, the position of the palm 10 is controlled such that the distance d(k) of the hand reference point $P_h(k)$ from the object reference point $P_w(k)$ in the current control cycle k becomes smaller than the distance d(k−1) of the hand reference point $P_h(k-1)$ from the object reference point $P_w(k-1)$ in the previous control cycle k−1. That is, the position of the palm 10 is controlled to satisfy the condition represented by the following expression (1):

$$\{x_h(k)-x_w(k)\}^2+\{y_h(k)-y_w(k)\}^2+\{z_h(k)-z_w(k)\}^2 < \{x_h(k-1)-x_w(k-1)\}^2+\{y_h(k-1)-y_w(k-1)\}^2+\{z_h(k-1)-z_w(k-1)\}^2 \quad (1)$$

Further, the posture of the palm 10 is controlled such that the first hand reference vector $\alpha_{h1}(k)$ comes close to the first object reference vector $\alpha_{w1}(k)$. More specifically, the posture of the palm 10 is controlled such that the first hand reference vector $\alpha_{h1}(k)$ in the current control cycle k is rotated by a first rotational angle $\phi_1(k)$ about the first rotational axis $a_1(k)$. That is, the posture of the palm 10 is controlled to satisfy the following expression (2):

$$Q(\alpha_{h1}(k+1))=Q_1^*(k)\cdot Q(\alpha_{h1}(k))\cdot Q_1(k) \quad (2)$$

Here, the first hand reference vector $\alpha_{h1}(k)$ in the control cycle k is represented as a quaternion $Q(\alpha_{h1}(k))$. Further, $Q_1(k)$ and $Q_1^*(k)$ are quaternions for representing the rotation of the first rotational angle $\phi_1(k)$ about the first rotational axis $a_1(k)$ (=$(x_1(k), y_1(k), z_1(k))$) in the three-dimensional space, which are expressed by the following expressions (2a) and (2b), respectively:

$$Q_1(k)=[\cos(\phi_1(k)/2),$$

$$x_1(k)\sin(\phi_1(k)/2), y_1(k)\sin(\phi_1(k)/2), z_1(k)\sin(\phi_1(k)/2)] \quad (2a)$$

$$Q_1^*(k)=[\cos(\phi_1(k)/2),$$

$$-x_1(k)\sin(\phi_1(k)/2), -y_1(k)\sin(\phi_1(k)/2), -z_1(k)\sin(\phi_1(k)/2)] \quad (2b)$$

Further, the first rotational axis $a_1(k)$ in the control cycle k is successively set (calculated) according to the following expression (2c):

$$a_1(k)=(\alpha_{w1}(k)\times\alpha_{h1}(k)/|\alpha_{w1}(k)\times\alpha_{h1}(k)| \quad (2c)$$

Furthermore, the first rotational angle $\phi_1(k)$ in the control cycle k is successively set (calculated) according to the following expression (2d):

$$\phi_1(k)=\beta_1(k)\cdot\cos^{-1}(\alpha_{h1}(k)\cdot\alpha_1(k)),$$

$$0<\beta_1(k)<1 \quad (2d)$$

Here, $\beta_1(k)$ is a coefficient for defining the amount (angle) of rotation about the first rotational axis $a_1(k)$ of the palm 10 in the control cycle k, which is set as appropriate in accordance with the target bending speed of the specified finger mechanism, capability of the actuator (not shown) for driving the robot R, and others. It is noted that the coefficient $\beta_1(k)$ may be constant.

Further, the posture of the palm 10 is controlled such that the second hand reference vector $\alpha_{h2}(k)$ comes close to the second object reference vector $\alpha_{w2}(k)$. More specifically, the posture of the palm 10 is controlled such that the second hand reference vector $\alpha_{h2}(k)$ in the current control cycle k is rotated by a second rotational angle $\phi_2(k)$ about the second rotational axis $a_2(k)$. That is, the posture of the palm 10 is controlled to satisfy the following expression (3):

$$Q(\alpha_{h2}(k+1))=Q_2^*(k)\cdot Q(\alpha_{h2}(k))\cdot Q_2(k) \quad (3)$$

Here, the second hand reference vector $\alpha_{h2}(k)$ in the control cycle k is represented as a quaternion $Q(\alpha_{h2}(k))$. Further, $Q_2(k)$ and $Q_2^*(k)$ are quaternions for representing the rotation of the second rotational angle $\phi_2(k)$ about the second rotational axis $a_2(k)$ (=$(x_2(k), y_2(k), z_2(k))$) in the three-dimensional space, which are expressed by the following expressions (3a) and (3b), respectively:

$$Q_2(k)=[\cos(\phi_2(k)/2),$$

$$x_2(k)\sin(\phi_2(k)/2), y_2(k)\sin(\phi_2(k)/2), z_2(k)\sin(\phi_2(k)/2)] \quad (3a)$$

$$Q_2^*(k)=[\cos(\phi_2(k)/2),$$

$$-x_2(k)\sin(\phi_2(k)/2), -y_2(k)\sin(\phi_2(k)/2), -z_2(k)\sin(\phi_2(k)/2)] \quad (3b)$$

Further, the second rotational axis $a_2(k)$ in the control cycle k is successively set (calculated) according to the following expression (3c):

$$a_2(k)=(\alpha_{w2}(k)\times\alpha_{h2}(k)/|\alpha_{w2}(k)\times\alpha_{h2}(k)| \quad (3c)$$

Furthermore, the second rotational angle $\phi_2(k)$ in the control cycle k is successively set (calculated) according to the following expression (3d):

$$\phi_2(k)=\beta_2(k)\cdot\cos^{-1}(\alpha_{h2}(k)\cdot\alpha_{w2}(k)),$$

$$0<\beta_2(k)<1 \quad (3d)$$

Here, $\beta_2(k)$ is a coefficient for defining the amount (angle) of rotation about the second rotational axis $a_2(k)$ of the palm 10 in the control cycle k, which is set as appropriate in accordance with the target bending speed of the specified finger mechanism, capability of the actuator (not shown) for driving the robot R, and others. The coefficient $\beta_2(k)$ may be constant.

The position and posture of the palm 10 are controlled by controlling the rotational angle of the first arm link P11 at the shoulder joint J11 with respect to the body P0, the bending angle of the arm P1 at the elbow joint J12, and the rotational angle of the palm 10 at the carpal joint J13 with respect to the second arm link P12. Further, the position and posture of the palm 10 are controlled by controlling the yaw angles of the upper and lower parts of the body P0 (torsion of the body P0) and the bending angle of the leg P2 at the knee joint J22 if necessary. Furthermore, each joint angle (controlled variable) may be successively calculated according to an inverse dynamics link model in the robot coordinate system (which is the model for expressing the position and posture of a link or specified element from the joint angle, assuming that the robot R is configured with a plurality of rigid links connected via a plurality of joints).

Figure 6:
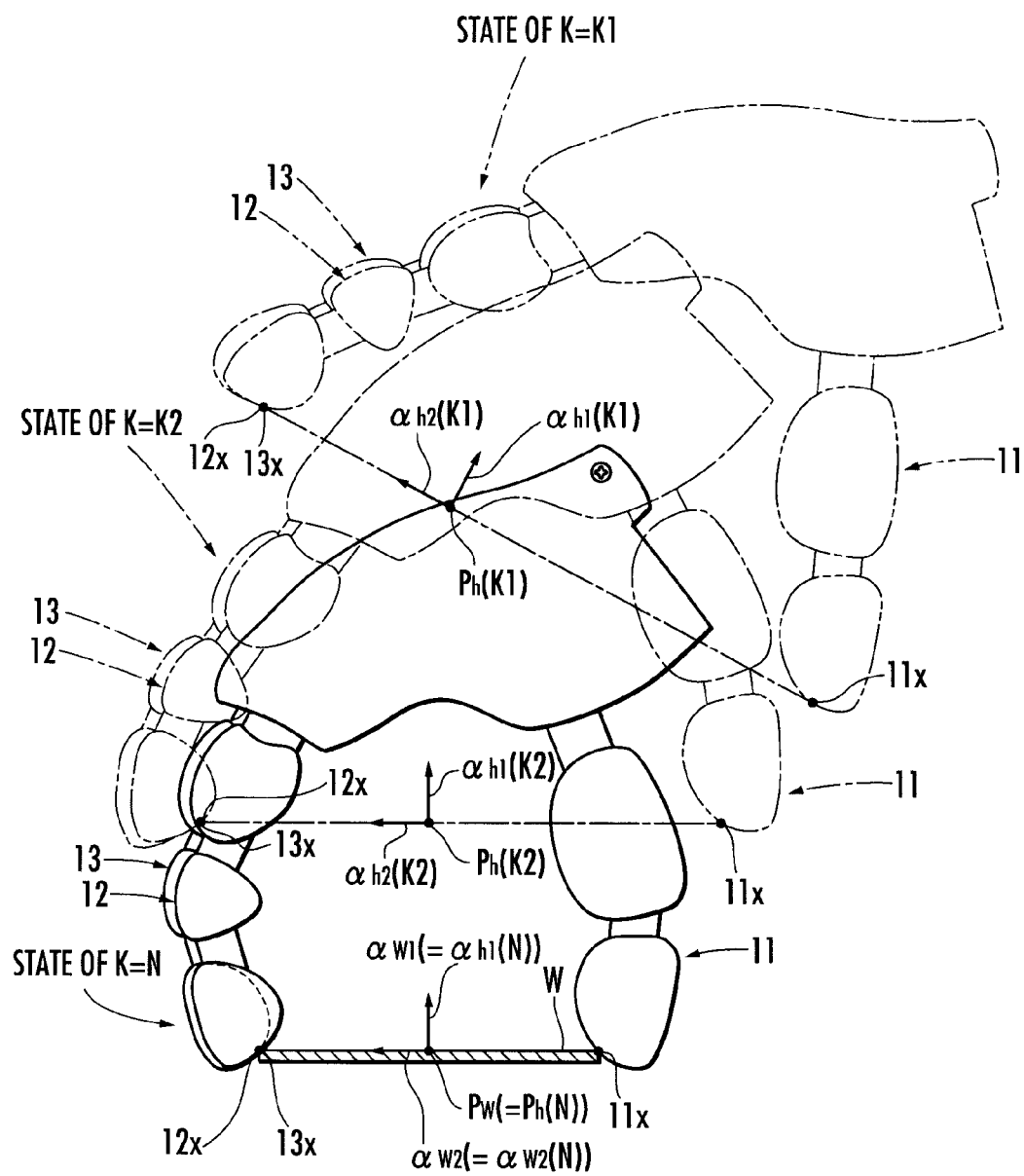
Figure 7:
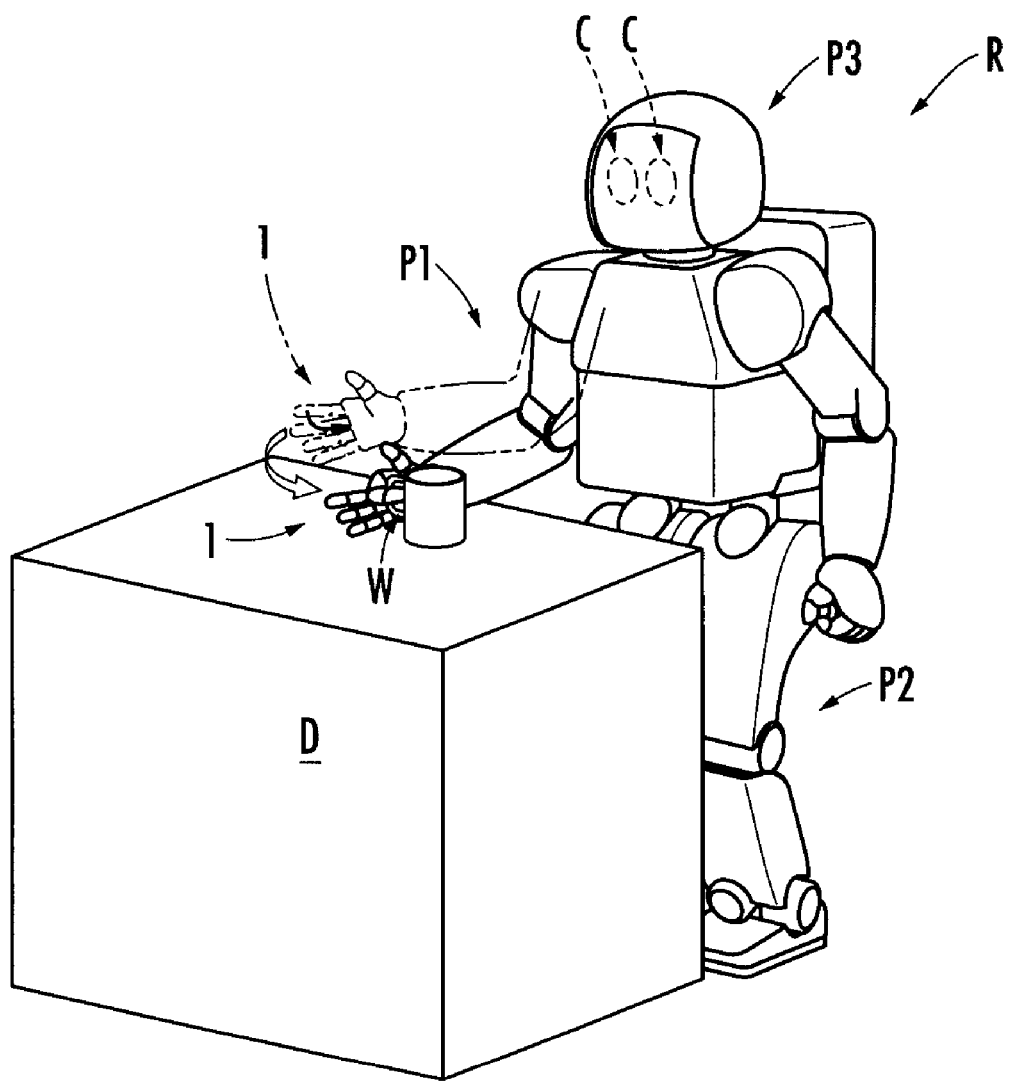
FIGS. 7-9 show by way of example a function of the hand control system (second example of the object).
Figure 9:
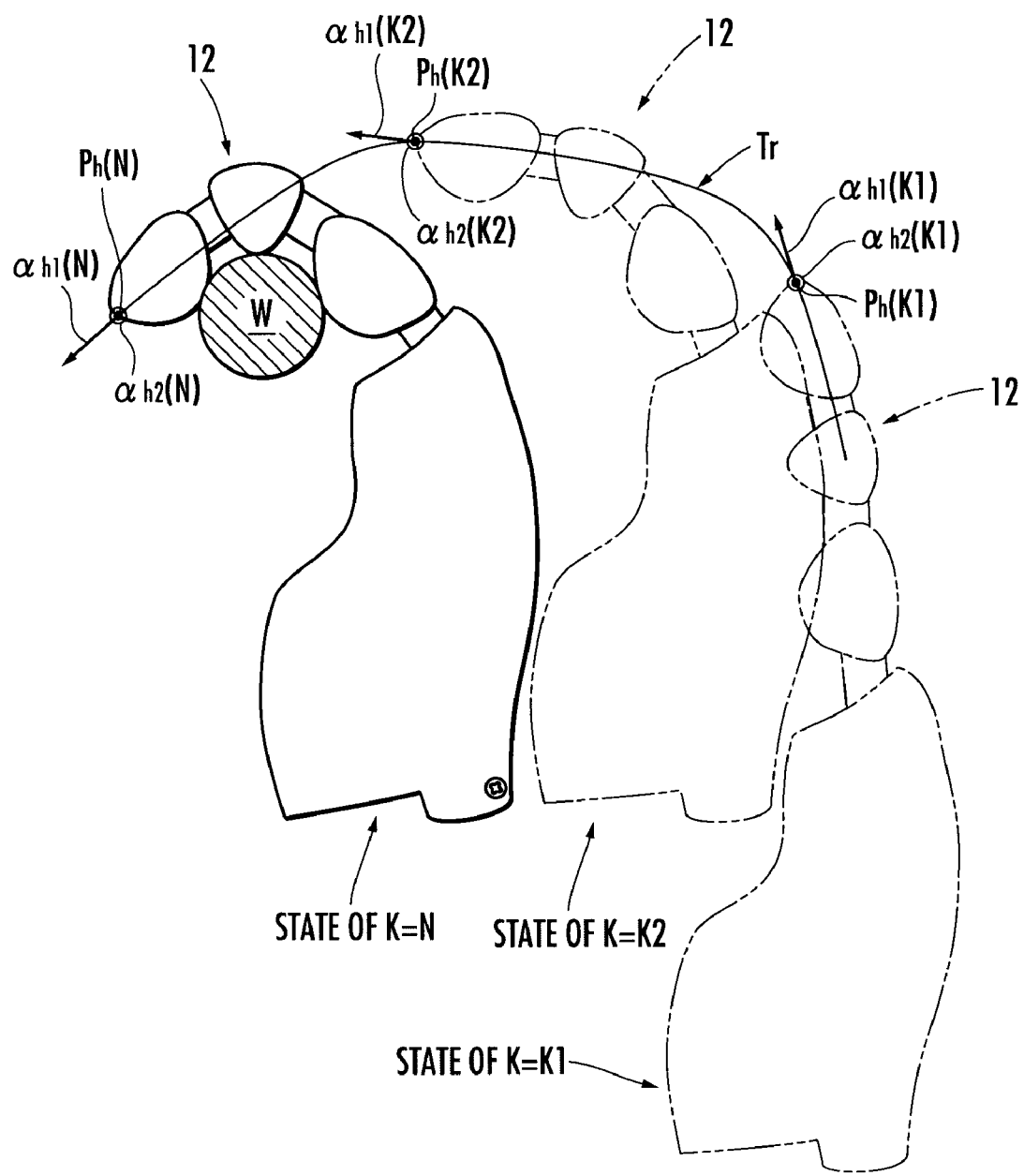

In this manner, when the object w is of a plate shape, the position and posture of the palm 10 are controlled, as shown in FIG. 6, to make transition from the state of k=$k_1$ (indicated by the chain double-chain line) to the state of k=$k_2$ (>$k_1$) (indicated by the chain line), and further to the state of k=N (>$k_2$) (indicated by the solid line). When the object w is of a stick shape, the position and posture of the palm 10 are controlled, as shown in FIG. 9, to make transition from the state of k=$k_1$ (indicated by the chain double-chain line) to the state of k=$k_2$ (indicated by the chain line), and further to the state of k=N (indicated by the solid line).

Subsequently, it is determined whether the distance d(k) between the hand reference point $P_h$(k) and the object reference point $P_w$(k) in the current control cycle k has become a threshold value $\epsilon$ or less, i.e., whether the following expression (4) is satisfied (FIG. 3; S9):

$$d(k) \leq \epsilon \tag{4}$$

The threshold value $\epsilon$ is set in accordance with part or all of the size, shape, position, and posture of the object w measured by the first processor 21.

If it is determined that the distance d(k) is greater than the threshold value $\epsilon$ (FIG. 3; S9: NO), the index k is incremented by 1 (FIG. 3; S12), and the above-described processing in S4 through S9 is repeated. On the other hand, if it is determined that the distance d(k) is equal to or less than the threshold value $\epsilon$ (FIG. 3; S9: YES), it is then determined whether the object reference point $P_w$(k) coincides with the hand reference point $P_h$(k), the first hand reference vector $\alpha_{h1}$(k) coincides with the first object reference vector $\alpha_{w1}$(k), and the second hand reference vector $\alpha_{h2}$(k) coincides with the second object reference vector $\alpha_{w2}$(k) (FIG. 3; S10). That is, it is determined whether the conditions represented by the following expressions (5a) to (5c) are all satisfied:

$$d(k)=0 \tag{5a}$$

$$\cos^{-1}(\alpha_{h1}(k)\cdot\alpha_{w1}(k))=0 \tag{5b}$$

$$\cos^{-1}(\alpha_{h2}(k)\cdot\alpha_{w2}(k))=0 \tag{5c}$$

It is also determined whether the tip end portions of all the specified finger mechanisms 11-13 have come into contact with the object w, based on the outputs of the contact sensors provided at the respective tip end portions of the specified finger mechanisms 11-13 (FIG. 3; S10). It is noted that a sensorless contact determination method as disclosed in Japanese Patent Laid-Open No. 2005-125462 may be employed instead of the contact determination based on the outputs of the contact sensors.

If the conditions are not satisfied (FIG. 3; S10: NO), the fourth processor 24 controls the operation(s) of the specified finger mechanism(s) to increase the degree(s) of bending of the specified finger mechanism(s) (FIG. 3; S11). The index k is incremented by 1 (FIG. 3; S12), and then the above-described processing in S4 through S10 is repeated. Meanwhile, if the relevant conditions are satisfied (FIG. 3; S10: YES), the control for grasping the object w is finished.

Accordingly, when the object w is of a plate shape, the control is effected, as shown in FIG. 6, such that the position and posture of the palm 10 and the degrees of bending of the specified finger mechanisms 11-13 make transition from the state of k=$k_2$ (indicated by the chain line) to the state of k=N (indicated by the solid line). As a result, the object w of the plate shape is grasped by the specified three finger mechanisms 11-13 (see the solid line in FIG. 6). When the object w is of a stick shape, the control is effected, as shown in FIG. 9, such that the position and posture of the palm 10 and the degree of bending of the specified finger mechanism 12 make transition from the state of k=$k_2$ (indicated by the chain line) to the state of k=N (indicated by the solid line). As a result, the object w of the stick shape is grasped by the specified finger mechanism 12 (see the solid line in FIG. 9) and further by the other finger mechanism such as the first finger mechanism 11 or the like if necessary.

Although the control for grasping the object w by the hand 1 is finished when the conditions represented by the expressions (5a) to (5c) are satisfied (S10), the relevant control may also be finished on the condition that a certain degree of contact of each of the specified finger mechanisms with the object w has been detected based on the outputs of the pressure sensors (not shown) provided in the specified finger mechanisms and the image processing based on the image data of the CCD cameras C.

According to the hand control system 2 exerting the above-described functions, the position and posture of the palm (base) 10 of the hand 1 are controlled such that the object reference point $P_w$(k) and the hand reference point $P_h$(k), the first object reference vector $\alpha_{w1}$(k) and the first hand reference vector $\alpha_{h1}$(k), and the second object reference vector $\alpha_{w2}$(k) and the second hand reference vector $\alpha_{h2}$(k) come close to each other (see FIG. 3; S8). The object reference point $P_w$, the first object reference vector $\alpha_{w1}$(k), and the second object reference vector $\alpha_{w2}$(k) correspond to the size, shape, position, and posture of the object w (see FIG. 3; S1, S4, S5). The hand reference point $P_h$, the first hand reference vector $\alpha_{h1}$(k), and the second hand reference vector $\alpha_{h2}$(k) correspond to the position and posture of the palm 10 and the posture(s) of the specified finger mechanism(s) (see FIG. 3; S6, S7). As such, the position and posture of the palm 10 are controlled appropriately in accordance with the size of the object w and the like, from the standpoint of grasping the relevant object by the specified finger mechanism(s). Further, the object can be grasped only by controlling the operation of the specified finger mechanism such that the degree of bending of the specified finger mechanism gradually increases during the controlling process of the position and posture of the palm 10 (see FIG. 3; S11). The control to gradually change the bending posture of the specified finger mechanism is simple compared to the posture control of each finger mechanism for causing the fingertip position to coincide with a target position of the object w, and therefore, the structures of the finger mechanisms can be simplified correspondingly. That is, it is possible to accurately grasp the object w of an arbitrary shape with a simplified structure than in the case of providing an actuator for each of the joints of the finger mechanisms 11-15 to move the finger mechanisms 11-15 by the respective motors M1-M5 independently from each other.

Therefore, according to the hand control system 2 of the present invention, it is possible to accurately grasp the object w of an arbitrary shape, while simplifying the structures of the finger mechanisms 11-15.

Further, the fourth processor gradually changes the bending posture of the specified finger mechanism when the distance d(k) between the object reference point $P_w$(k) and the hand reference point $P_h$(k) becomes equal to or less than the threshold value $\epsilon$ which corresponds to part or all of the size, shape, position, and posture of the object w (FIG. 3; S9, S11). This makes it possible to grasp the object while ensuring smooth operation of the specified finger mechanism, by setting the timing of changing the bending posture of the specified finger mechanism appropriately in consideration of part or all of the size, shape, position, and posture of the object w. For example, when the object w is small, it is controlled such that the bending posture of the specified finger mechanism is started to change at a time point when the hand 1 (or the hand reference point $P_h$) is still far from the object w (or the object reference point $P_w$), in which case the degree of closing or opening of the hand 1 when the hand 1 comes in the close vicinity of the object w can be rendered appropriate in view of the size of the object w. On the other hand, when the object w is large, it is controlled such that the bending posture of the specified finger mechanism is started to change at a time point when the hand 1 is near the object w, which ensures an appropriate degree of closing or opening of the hand 1 when it comes in the close vicinity of the object w in view of the size of the object w. As such, a wasteful operation of the specified finger mechanism, causing the hand 1 to close and open again, can be eliminated.

Furthermore, the relative rotations of the i-th object reference vector $\alpha_{wi}(k)$ and the i-th hand reference vector $\alpha_{hi}(k)$ are represented (arithmetically processed) by using the quaternions $Q_1$ and $Q_2$ (see the expressions (2) and (3)). This enables control of the posture of the hand 1 in a shortest period of time (or moving distance) while effecting spherical linear interpolation about an axis. Accordingly, a wasteful operation of the hand 1 can be avoided, and the possibility that the hand 1 comes into contact with an object that is present nearby but that is not the one to be grasped can be reduced considerably. Further, it is possible to cause the hand 1 to approach the object w to be grasped from an appropriate direction. Gimbal lock is also prevented reliably. Still further, since the rotation can be described with only four numerical values, the resources such as the memory for the arithmetic processing can be saved compared to the case of the affine transformation matrix method and the like.

It is noted that the degree of bending of the specified finger mechanism may be increased in consideration of one or both of the following as the additional or alternative requirements: that the angle between the first hand reference vector $\alpha_{h1}(k)$ and the first object reference vector $\alpha_{w1}(k)$ (hereinafter, referred to as the "first angle deviation") $\cos^{-1}(\alpha_{h1}(k)\cdot\alpha_{w1}(k))$ is equal to or less than a threshold value $\theta_{th1}$ in accordance with the size of the object w and the like; and that the angle between the second hand reference vector $\alpha_{h2}(k)$ and the second object reference vector $\alpha_{w2}(k)$ (hereinafter, referred to as the "second angle deviation") $\cos^{-1}(\alpha_{h2}(k)\cdot\alpha_{w2}(k))$ is equal to or less than a threshold value $\theta_{th2}$ in accordance with the size of the object w and the like.

It is also possible to set priorities for the approach of the hand reference point $P_h(k)$ to the object reference point $P_w(k)$, the approach of the first hand reference vector $\alpha_{h1}(k)$ to the first object reference vector $\alpha_{w1}(k)$, and the approach of the second hand reference vector $\alpha_{h2}(k)$ to the second object reference vector $\alpha_{w2}(k)$, in accordance with part or all of the size, shape, position, and posture of the object w. For example, the position and posture of the palm 10 and the degree of bending of the specified finger mechanism may be controlled such that the second hand reference vector $\alpha_{h2}(k)$ comes close to the second object reference vector $\alpha_{w2}(k)$ after the first angle deviation $\cos^{-1}(\alpha_{h1}(k)\cdot\alpha_{w1}(k))$ becomes equal to or less than the threshold value $\theta_{th1}$. Further, the position and posture of the palm 10 and the degree of bending of the specified finger mechanism may be controlled such that the hand reference point $P_h(k)$ approaches the object reference point $P_w(k)$ after the first angle deviation $\cos^{-1}(\alpha_{h1}(k)\cdot\alpha_{w1}(k))$ becomes equal to or less than the threshold value $\theta_{th1}$ and the second angle deviation $\cos^{-1}(\alpha_{h2}(k)\cdot\alpha_{w2}(k))$ becomes equal to or less than the threshold value $\theta_{th2}$.

What is claimed is:

1. A hand control system controlling a grasping operation of an object by a hand extended from a base and having a plurality of finger mechanisms capable of bending and stretching, the system comprising:
    a first processor recognizing part or all of size, shape, position, and posture of the object, and recognizing an object reference point and an i-th (i=1, 2, . . . ) object reference vector having the object reference point as a starting point in accordance with the recognized information;
    a second processor recognizing position and posture of the base and bending posture of a specified finger mechanism from among the plurality of finger mechanisms, and recognizing a hand reference point and an i-th hand reference vector having the hand reference point as a starting point in accordance with the recognized information;
    a third processor controlling the position and posture of the base such that the object reference point and the i-th object reference vector recognized by the first processor and the hand reference point and the i-th hand reference vector recognized by the second processor come close to each other, respectively; and
    a fourth processor gradually changing the bending posture of the specified finger mechanism during the controlling process of the position and posture of the base by the third processor.

2. The hand control system according to claim 1, wherein the fourth processor gradually changes the bending posture of the specified finger mechanism when one or both of a distance between the object reference point and the hand reference point and an angle between the i-th object reference vector and the i-th hand reference vector attain a value within a range corresponding to part or all of the size, shape, position, and posture of the object recognized by the first processor.

3. The hand control system according to claim 1, wherein when the first processor recognizes a plate shape as the shape of the object,
    the first processor sets the object reference point at a center of the object of the plate shape, sets a unit normal vector of the plate as a first object reference vector (i=1), and sets a unit tangent vector of the plate as a second object reference vector (i=2), and
    the second processor measures as the hand reference point a center of a triangle having a tip end portion of the specified finger mechanism and tip end portions of the finger mechanisms opposing the specified finger mechanisms as vertices, measures a unit normal vector of a plane including the triangle as a first hand reference vector (i=1), and measures a unit tangent vector of the plane as a second hand reference vector (i=2).

4. The hand control system according to claim 1, wherein when the first processor recognizes a stick shape as the shape of the object,
    the first processor sets the object reference point on a trajectory surrounding the object of the stick shape, sets a unit tangent vector of the trajectory as a first object reference vector (i=1), and sets a unit binormal vector of the trajectory as a second object reference vector (i=2), and the second processor measures a point on a rotational axis of the specified finger mechanism as the hand reference point, measures a unit vector orthogonal to the rotational axis and directed to a tip end portion of the specified finger mechanism as a first hand reference vector (i=1), and measures a unit vector in a direction of the rotational axis as a second hand reference vector (i=2).

5. The hand control system according to claim 1, wherein the third processor controls the posture of the base using a quaternion such that the i-th hand reference vector comes close to the i-th object reference vector.

6. The hand control system according to claim 1, controlling a grasping operation of an object by the hand attached to an end of an arm extended from an upper part of a base of a legged mobile robot capable of moving by operations of a plurality of legs extended from a lower part of the base.

7. The robot, comprising the hand control system as recited in claim 6 and the hand, the grasping operation of an object of which is controlled by the hand control system.

8. The hand control system according to claim 1, wherein part or all of the first processor, the second processor, the third processor, and the fourth processor are configured with a same processor.

9. The hand, the grasping operation of an object of which is controlled by the hand control system as recited in claim 1.

10. A method for controlling a grasping operation of an object by a hand extended from a base and having a plurality of finger mechanisms capable of bending and stretching, the method implementing:

a first process of recognizing part or all of size, shape, position, and posture of the object, and recognizing an object reference point and an i-th (i=1, 2, ... ) object reference vector having the object reference point as a starting point in accordance with the recognized information;

a second process of recognizing position and posture of the base and bending posture of a specified finger mechanism from among the plurality of finger mechanisms, and recognizing a hand reference point and an i-th hand reference vector having the hand reference point as a starting point in accordance with the recognized information;

a third process of controlling the position and posture of the base such that the object reference point and the i-th object reference vector recognized in the first process and the hand reference point and the i-th hand reference vector recognized in the second process come close to each other, respectively; and a fourth process of gradually changing the bending posture of the specified finger mechanism during the control of the position and posture of the base in the third process.

11. A program causing a computer to function as a system that controls a grasping operation of an object by a hand extended from a base and having a plurality of finger mechanisms capable of bending and stretching, wherein the computer is caused to function as the hand control system as recited in claim 1.

* * * * *